United States Patent Office 3,406,595
Patented Oct. 22, 1968

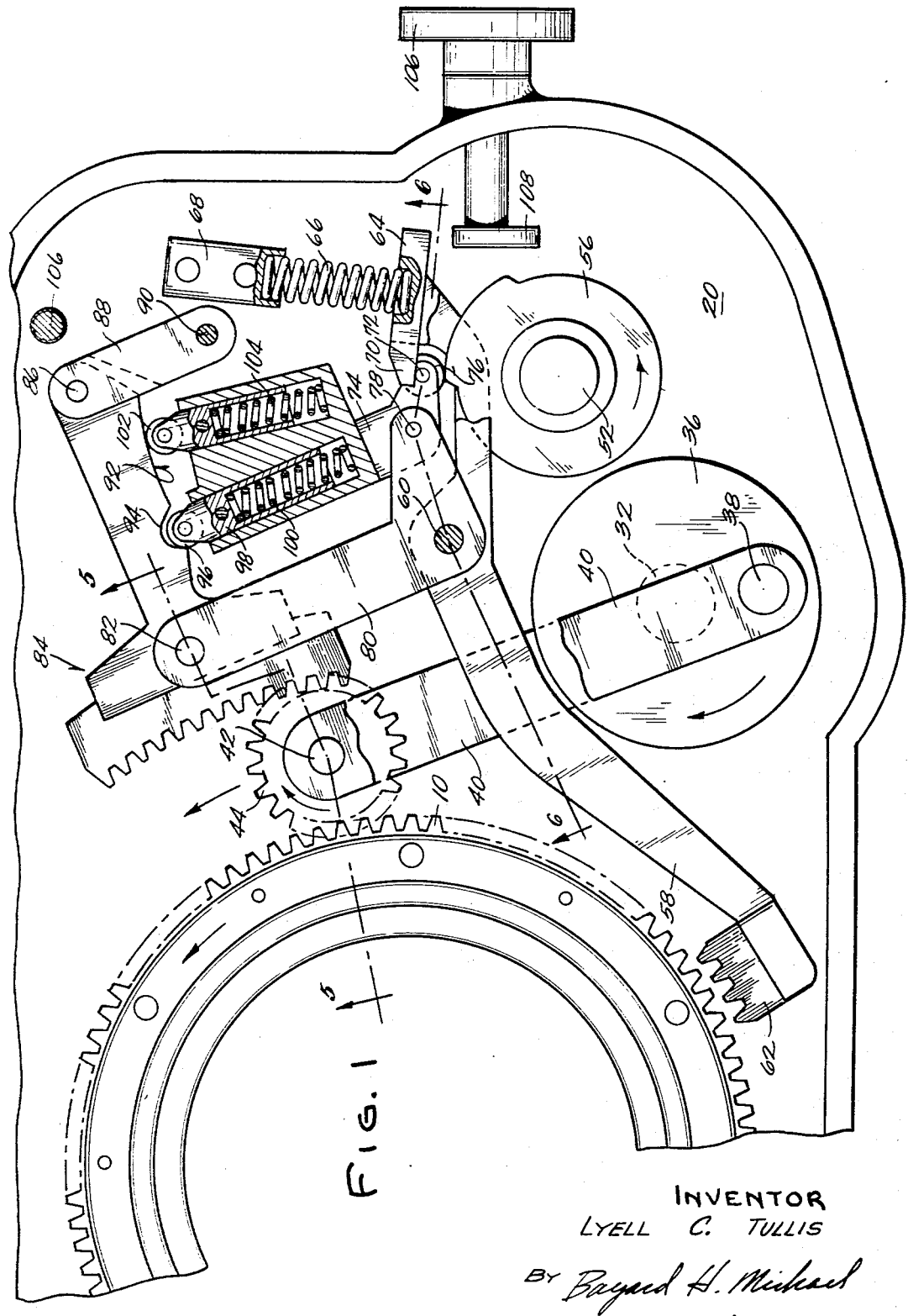

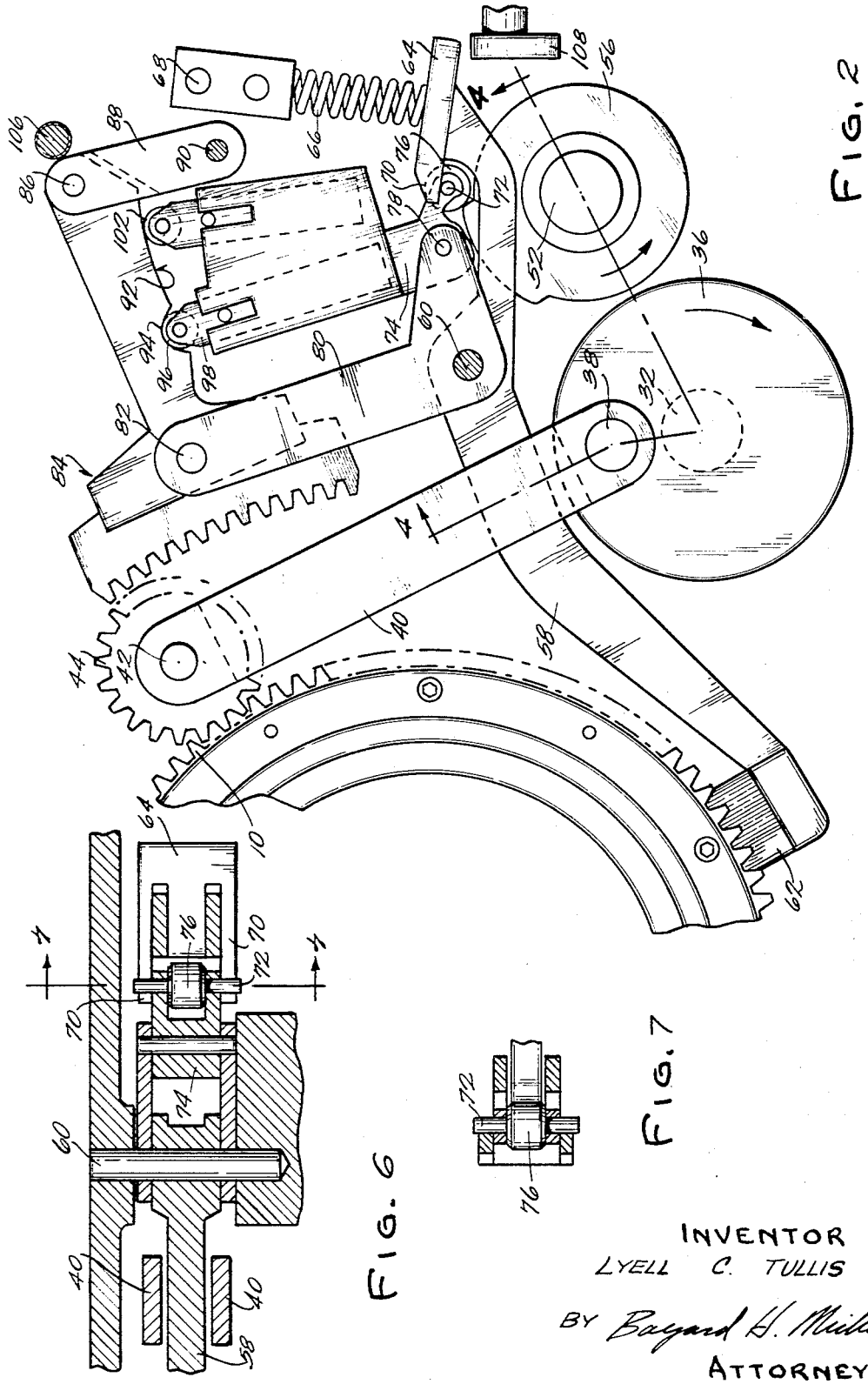

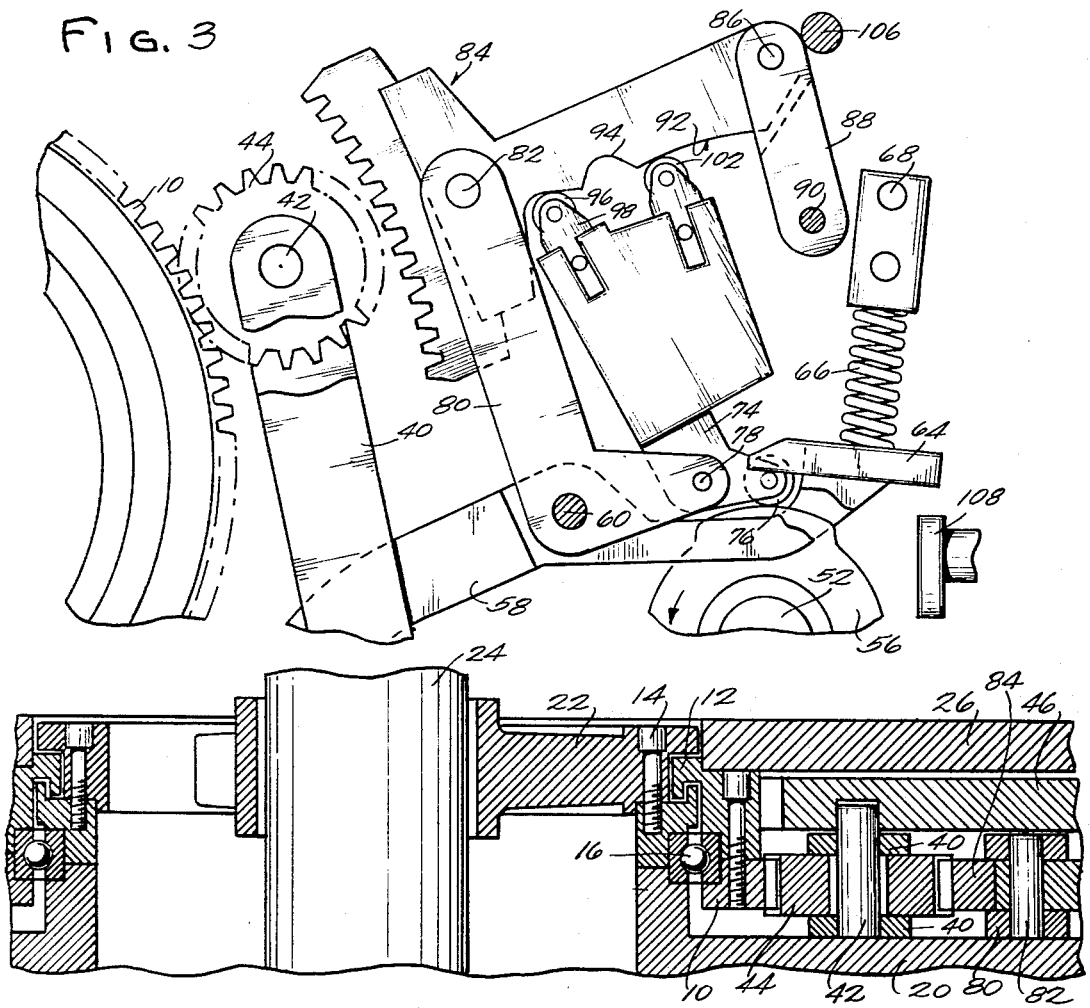

3,406,595
INDEX UNIT
Lyell C. Tullis, Janesville, Wis., assignor to Giddings & Lewis Machine Tool Company, Fond du Lac, Wis., a corporation of Wisconsin
Filed Apr. 13, 1967, Ser. No. 630,611
9 Claims. (Cl. 74—814)

ABSTRACT OF THE DISCLOSURE

The index table is carried on a ring gear which is indexed when a rack segment is positioned so an idler pinion on a connecting rod engages the rack and ring gear. On the return stroke and during dwell a cam moves the rack segment to inactive position and a shot-pin gear segment holds the ring. If the ring jams, a spring loaded overload arrangement withdraws the rack segment which will be returned to operation on the next index stroke. The ring gear permits a large center opening and large bearing surfaces. The ratio between the connecting rod shaft and cam shaft speed determines the portion of the cycle for indexing. The stroke of the connecting rod determines the number of indexes.

Background of invention

Index units are used in automatic machinery to support a workpiece and move it from station to station. The prior art has employed various approaches but none has afforded the combined features of this invention by way of simple alteration of the index/dwell ratio, number of indexes or stops, central access from below, large bearings giving a rigid table support, all with jam protection which automatically resets.

Summary of invention

By use of a large ring gear supported on large bearings the table carried by the ring gear can have a large center opening for bringing in tools or services from below while insuring a rugged table. The shot-pin function is provided by a gear segment engaging the ring gear to eliminate play during the work portion (dwell) of the cycle. Since the speed ratio between the connecting rod shaft and the control cam shaft determines the index/dwell ratio the ratio can be simply changed by changing the interconnecting gearing. Altering the stroke of the connecting rod changes the number of index steps and this affords considerable freedom of design at low cost. The jam protection is simple and automatically resets with each cycle to see if the jam has cleared.

Description of drawings

FIG. 1 is a partial plan view with the cover and table removed to expose the index mechanism, some of which has been broken away to show parts below and other parts of which have been shown in section to show interior construction. This view is at the start of the index stroke.

FIG. 2 is comparable to FIG. 1 but shows the parts just after the completion of the index stroke beginning the return stroke which is properly considered part of the dwell time of the cycle.

FIG. 3 shows the pertinent parts in the position occupied when the table has jammed and the overload protection has acted to remove the rack segment from engagement with the drive-idler pinion.

FIG. 4 is a partial vertical section taken on the broken line 4—4 in FIG. 2.

FIG. 5 is a partial vertical section taken on line 5—5 of FIG. 1.

FIG. 6 is a fragmentary vertical section taken on broken line 6—6 of FIG. 1.

FIG. 7 is a fragmentary section taken on line 7—7 of FIG. 6.

Description of preferred embodiment

Referring now to FIGS. 1 and 5, the ring gear 10 has an annular member 12 connected thereto by means of cap screws 14 to capture the outer race of bearing 16, the inner race of which is suitably fixed to the housing 20 and which supports a spider 22 which has a central aperture through which column 24, carrying either tool supports or services, may pass. The entire inner opening can, of course, be left open or other arrangements for bringing services or tools through can be employed. The table 26 is fixed to the annulus 12 for rotation with the ring gear.

As can be seen in FIG. 4, a drive shaft 28 engages the spiral gears 30 on shaft 32 which is journaled in bearing 34 and carries plate 36 in which the pin 38 is fixed to pivotally engage one end of connecting rod 40. The other end of the connecting rod is provided with a pin 42 which journals the drive-idler pinion gear 44. The upper end of pin 42 projects into an arcuate guide slot in the underside of cover 46 to keep the pinion tracking so as to constantly engage the ring gear 10.

Shaft 32 is provided with a drive gear 48 engaging gear 50 on shaft 52 which is journaled at 54 and carries the cam 56. Thus the cam and the connecting rod are rotated in synchronism with the speed ratio between the two shafts determined by the gearing 48, 50.

Now referring to FIGS. 1 and 6, it will be seen that link 58 is pivoted on pin 60. The left end of the link carries the gear segment 62 which can be moved into engagement with the ring gear to lock the ring gear and serve the shot-pin function. From the pivot to the right end (FIG. 1) of the link 58 the link is bifurcated to straddle the cam 56. The right end of the link is provided with a vertical pad 64 which serves as a seat for spring 66 compressed against the fixed seat 68. The pad also is provided with projecting fingers 70 which bear against the ends of shaft 72 which is supported in carrier 74 between the spread finger portions thereof between which the cam follower or roller 76 is mounted. From this it will be seen that the compressed spring 66 acts to rock the link 58 in a clockwise direction about pivot 60 and this motion is transferred to the projecting ends of pin 72 to, in turn, force the cam follower 76 against the contour of cam 56.

Carrier 74 is pivoted at 78 to the bell crank 80 which is pivoted on pin 60. Therefore, the force of spring 66 tends to rotate carrier 74 about pin 78 and the spring force is also transferred through the pin 78 to tend to rock bell crank 80 clockwise about its pivot 60. The other end of the bell crank is provided with a pin 82 which is connected to the rack segment assembly 84, the other end of which is provided with a pin 86 connected to idler link 88 pivoted on fixed pin 90. The rack segment assembly 84 includes the cam surface 92 having a notch portion 94 into which roller 96 normally projects. The roller is pivotally carried on a pin on the end of plunger 98 biased outwardly by spring 100 in carrier 74. The carrier includes a second roller 102 similarly biased by spring 104 bearing against the cam track portion to the right of the notch. The two rollers give better control of the overload force, as will appear hereinafter.

In FIG. 1 the parts are shown as the index stroke is initiated. At this point it will be noted that the cam follower 76 is on the lobe portion of cam 56. Therefore, the lobe will force the follower and, hence, carrier 74 about pivot 78 and will also move pin 78 to move pad 64 and link 58 counterclockwise about pivot 60. This withdraws the gear segment 62 from the ring gear, thus freeing the ring gear and the table carried thereby for rotation. At the same time this action forces the bell crank 80 in a counterclockwise direction about pivot 60 to force the rack segment into engagement with the drive pinion gear 44. Now as the disc 36 continues its rotation in the clockwise direction indicated by the arrow the connecting rod forces the gear 44 between the ring gear and the rack and since the rack is fixed the necessary resultant rotation is imparted to the ring gear.

At the end of the stroke of the connecting rod the cam follower 76 drops off the lobe as illustrated in FIG. 2. This allows spring 66 to act against pad 64 to rock the link 58 in a clockwise direction about pivot 60 to force the gear segment 62 into locking engagement with the ring gear and at the same time rocks the bell crank 80 in a clockwise direction about pivot 60 to pull the rack segment out of engagement with the pinion gear. Now as the disc continues rotation and the connecting rod is withdrawn, the gear 44 merely idles and, indeed, will continue to do so from this point for the remaining five-sixths of an operating cycle, this having been determined by the fact that the gear ratio between gears 48 and 50 is 1:3. If different index/dwell ratio is desired it is only necessary to change the gear ratio.

It is to be noted in FIG. 2 that the action of spring 66 on the linkage has withdrawn the rack segment to the right until link 88 abuts fixed stop 106. Any further action as the cam follower 76 wants to bottom on the dwell portion of cam 56 appears as relative movement between carrier 74 and the cam track 92 fully seating gear segment 62 in ring gear 10 and rack segment 84 to idler 44 which presses against ring gear 10, thus obtaining zero backlash.

If during an indexing motion the ring gear becomes jammed, provision is made for the protection against overload. This action is illustrated in FIG. 3. Here the parts are shown in the released position and this results from the pressure between the gear teeth and the rack segment generating enough force to overcome spring 100 and force the cam track 92 to the right with respect to roller 96. As soon as the hump passes under the roller a snap action is achieved as the roller rolls down the sharp incline to the left of the notch. When the cam follower 76 drops off the lobe of cam 56 the return spring 66, being stronger than the force of the relatively light spring 100, will force the carrier 74 about its pivot 78 to cause the roller 96 to roll back into the notch 94, thus resetting the rack for actuation on the next time the lobe comes under the follower. Of course, if the ring gear or table is still jammed it will immediately kick out and protect against overload and destruction of the mechanism but on each cycle it will reset itself and test to see if the jam has been cleared. The second roller 102 merely functions to balance some forces and make release operation more reliable.

From the foregoing it will be appreciated that the number of steps required in traveling around the ring gear can be readily adjusted by adjusting the stroke of the connecting rod. With the 2:1 amplifying effect of the crank and connecting rod motion combined with the idler gear a much smaller drive case can be used.

It is desirable that the number of teeth in the ring gear be divisible by many numbers. For example, with a 96 tooth ring gear various steps can be obtained as follows: 48, 32, 24, 16, 12, 8, and 6. Also, as indicated above, by changing the gear ratio the index/dwell ratio can be readily adjusted. With the 1:3 reduction shown the index time is one-sixth of the cycle. This can be adjusted. For example, with a 1:1 ratio, the index time will be one-half with the other half being used for dwell or return of the pinion gear. With a 1:1, one-fourth of the time would be index and three-fourths would be for dwell.

One further feature may be noted. The externally accessible knob 196 may be turned to turn cam 108 to act against pad 64 and manually move the gear segment 62 out of engagement with the ring to permit free rotation of the table.

I claim:
1. An index unit comprising,
 (a) a housing,
 (b) a ring gear rotatably mounted in the housing,
 (c) a pinion gear,
 (d) power means for moving the pinion gear in rolling contact with the ring gear over an arcuate path with a reciprocating motion in alternate forward and return strokes,
 (e) a rack movable into and out of engagement with the pinion so the ring gear is moved when the rack is engaged with the pinion,
 (f) gear segment means engageable with the ring gear to hold the ring gear from movement while the rack is disengaged from the pinion gear and movable to an inactive position when the rack is engaged with the pinion gear,
 (g) cam means for actuating the rack and the gear segment means.

2. An index unit according to claim 1 in which the power means and the cam means are synchronized whereby during a forward stroke of the pinion gear the rack is engaged with the ring gear and the gear segment is disengaged from the ring gear.

3. An index unit according to claim 2 in which the rack is carried on a linkage one portion of which carries a cam follower and
 said cam means is engaged by the cam follower.

4. An index unit according to claim 3 in which the power means includes
 a connecting rod connected to the pinion gear and actuated by an arm mounted on a first shaft,
 said cam means including a cam mounted on a second shaft, the first and second shafts being interconnected to insure synchronization of the shafts.

5. An index unit according to claim 4 including a yieldable connection between the cam follower and the linkage to allow withdrawal of the rack in response to abnormal loading of the rack teeth in the event the ring gear is restrained from movement.

6. An index unit according to claim 5 in which the yieldable connection includes a cam track and
 a spring loaded track follower,
 said track being shaped to impart a withdrawal motion to the rack when a predetermined loading is exceeded whereby the rack is retained in the withdrawn position.

7. An index unit according to claim 6 including means operative subsequent to such withdrawal and in response to normal withdrawal movement called for by the cam to restore the rack to its normal position relative to its supporting linkage.

8. An index unit according to claim 7 in which the linkage carrying the rack includes a parallel linkage including two generally parallel links each mounted on a fixed pivot and interconnected at their free ends by a link which carries the rack, one of the parallel links having a connection to a support for said cam follower, said cam track being on the interconnecting link and the spring loaded track follower acts between the cam follower support and the track.

9. An index unit according to claim 3 in which the gear segment is carried on a link which is actuated by the cam follower.

References Cited

UNITED STATES PATENTS

| 2,672,773 | 3/1954 | Schofield | 74—822 XR |
| 2,902,889 | 9/1959 | Trechsel | 74—823 |
| 3,085,452 | 4/1963 | Thompson | 74—822 |
| 3,232,140 | 2/1966 | Henkel | 74—822 |

FRED C. MATTERN, JR., *Primary Examiner.*

B. T. CALLAHAN, *Assistant Examiner.*